United States Patent
Saito

(10) Patent No.: US 11,236,862 B2
(45) Date of Patent: Feb. 1, 2022

(54) LUBRICANT CARTRIDGE CONTAINER AND LUBRICANT SUPPLY SYSTEM PROVIDED WITH THE SAME

(71) Applicant: LUBE CO., LTD., Tokyo (JP)

(72) Inventor: Keizo Saito, Tokyo (JP)

(73) Assignee: LUBE CO., LTD., Tokyo (JP)

( * ) Notice: Subject to any disclaimer, the term of this patent is extended or adjusted under 35 U.S.C. 154(b) by 351 days.

(21) Appl. No.: 16/348,737

(22) PCT Filed: Oct. 30, 2017

(86) PCT No.: PCT/JP2017/039103
§ 371 (c)(1),
(2) Date: May 9, 2019

(87) PCT Pub. No.: WO2018/092571
PCT Pub. Date: May 24, 2018

(65) Prior Publication Data
US 2019/0301674 A1 Oct. 3, 2019

(30) Foreign Application Priority Data
Nov. 16, 2016 (JP) .............................. JP2016-223335

(51) Int. Cl.
*F16N 19/00* (2006.01)
*F16N 7/38* (2006.01)
(Continued)

(52) U.S. Cl.
CPC ......... *F16N 19/00* (2013.01); *B65D 83/0005* (2013.01); *F16N 7/36* (2013.01); *F16N 7/38* (2013.01)

(58) Field of Classification Search
CPC ..... F16N 13/02; F16N 19/00; B65D 83/0005; B65D 83/0022; B65D 83/0033; B65D 83/0038; B65D 83/005; B05C 17/00576
See application file for complete search history.

(56) References Cited

U.S. PATENT DOCUMENTS

| | | | | |
|---|---|---|---|---|
| 3,315,847 A | * | 4/1967 | Trumbull | .......... B05C 17/00576 222/327 |
| 3,378,175 A | * | 4/1968 | Krieps | .............. B05C 17/00576 222/327 |

(Continued)

FOREIGN PATENT DOCUMENTS

| | | |
|---|---|---|
| JP | S50-122775 U | 10/1975 |
| JP | S53-58284 U | 5/1978 |

(Continued)

OTHER PUBLICATIONS

PCT/ISA/210, "International Search Report for International Application No. PCT/JP2017/039103," Jan. 23, 2018.

*Primary Examiner* — Minh Truong
(74) *Attorney, Agent, or Firm* — Manabu Kanesaka

(57) ABSTRACT

A lubricant cartridge container includes a cylindrical member, and a moving member moving inside the cylindrical member toward a lubricant inflow portion side as a fluid lubricant flows toward the lubricant inflow portion side when subjected to a suction force from a lubricating pump side. The moving member has a first moving main body portion moving inside the cylindrical member and contacting with a shoulder portion, and a second moving main body portion contacting with the lubricant inflow portion after the first moving main body portion comes in contact with the shoulder portion. The second moving main body portion has a center portion contacting with the lubricant inflow portion, and a step portion connecting the center portion and the first moving main body portion. The center portion has a recess recessed in a polygonal shape formed by connecting a plurality of apexes in a plan view.

5 Claims, 4 Drawing Sheets

(51) Int. Cl.
*B65D 83/00* (2006.01)
*F16N 7/36* (2006.01)

(56) References Cited

U.S. PATENT DOCUMENTS

| | | | | |
|---|---|---|---|---|
| 5,170,913 | A * | 12/1992 | Spatz | B65D 83/0033 |
| | | | | 222/209 |
| 6,409,053 | B2 * | 6/2002 | Stossel | B65D 83/0005 |
| | | | | 222/386 |
| 10,543,508 | B2 * | 1/2020 | Obrist | B05C 17/00553 |
| 2013/0334257 | A1 * | 12/2013 | Brugger | B05B 11/00416 |
| | | | | 222/256 |
| 2014/0054314 | A1 * | 2/2014 | Kern | A61J 1/062 |
| | | | | 222/1 |
| 2015/0136812 | A1 * | 5/2015 | Krallmann | A47K 5/18 |
| | | | | 222/386 |

FOREIGN PATENT DOCUMENTS

| | | |
|---|---|---|
| JP | H07-137231 A | 5/1995 |
| JP | 2000-318769 A | 11/2000 |
| JP | 2001-173887 A | 6/2001 |
| JP | 2005-133864 A | 5/2005 |
| JP | 2006-336664 A | 12/2006 |
| WO | 2012/050080 A1 | 4/2012 |

\* cited by examiner

LUBRICANT CARTRIDGE CONTAINER AND LUBRICANT SUPPLY SYSTEM PROVIDED WITH THE SAME

RELATED APPLICATIONS

The present application is National Phase of International Application No. PCT/JP2017/039103 filed Oct. 30, 2017, and claims priority from Japanese Application No. 2016-223335, filed Nov. 16, 2016, the disclosure of which is hereby incorporated by reference herein in its entirety.

TECHNICAL FIELD

The present invention relates to a lubricant cartridge container attached to various lubricating pumps which supply a fluid lubricant (appropriately referred to as "lubricant") such as grease or oil for the purpose of lubrication and the like of a machine tool, an industrial machine, and so on, and a lubricant supply system provided with the lubricant cartridge container.

BACKGROUND ART

Conventionally, there has been known a lubricant cartridge container which supplies a fluid lubricant to a lubricating pump by being attached to a connecting member of the lubricating pump provided with a lubricant inflow portion for leading the fluid lubricant to the lubricating pump.

This lubricant cartridge container has: a cylindrical member attached to the connecting member of the lubricating pump, and supplying the fluid lubricant to the lubricating pump through the lubricant inflow portion when subjected to a suction force from the lubricating pump side; a moving member disposed inside the cylindrical member so as to accommodate the fluid lubricant in a space portion formed between the moving member and the lubricant inflow portion in a state where the cylindrical member is attached to the connecting member of the lubricating pump, and moving inside the cylindrical member toward the lubricant inflow portion side as the fluid lubricant flows toward the lubricant inflow portion side when subjected to the suction force from the lubricating pump side; and an elastic seal member provided to the moving member, and pressed against an inside surface of the cylindrical member to maintain an airtight state between an outside surface of the moving member and the inside surface of the cylindrical member (refer to Patent Document 1).

According to this lubricant cartridge container, the moving member is disposed inside the cylindrical member so as to accommodate the fluid lubricant in the space portion formed between the moving member and the lubricant inflow portion in the state where the cylindrical member is attached to the connecting member of the lubricating pump. Further, the fluid lubricant flows toward the lubricant inflow portion side and the moving member moves inside the cylindrical member toward the lubricant inflow portion side when subjected to the suction force from the lubricating pump side. Consequently, the fluid lubricant filled in the lubricant cartridge container is supplied to the lubricating pump.

PRIOR ART DOCUMENT

Patent Document

Patent Document 1: WO2012/050080 (International Publication)

DISCLOSURE OF THE INVENTION

Problems to Be Solved by the Invention

Incidentally, in the above-described lubricant cartridge container, a part of the elastic seal member is elastically deformed by being subjected to the suction force, and moves toward the lubricant inflow portion side to come in contact with the lubricant inflow portion, but, there has been a worry that the part of the elastic seal member is not elastically deformed sufficiently even in the state of being subjected to the suction force, which leads to a contact failure between the part of the elastic seal member and the lubricant inflow portion. Accordingly, there has been a worry that a control failure due to the contact between the part of the elastic seal member and the lubricant inflow portion is caused.

Accordingly, a first invention is invented for solving the above-described problems, and an object thereof is to provide a lubricant cartridge container in which a moving member can surely come in contact with a lubricant inflow portion.

A second invention has an object to provide a lubricant supply system capable of preventing a control failure regarding drive control of the lubricant supply system.

Means for Solving the Problems

A first invention is characterized in that it is a lubricant cartridge container which supplies a fluid lubricant to a lubricating pump by being attached to a connecting member of the lubricating pump provided with a lubricant inflow portion for leading the fluid lubricant to the lubricating pump, the lubricant cartridge container including: a cylindrical member configured to be able to fill the fluid lubricant therein, attached to the connecting member of the lubricating pump, and supplying the fluid lubricant to the lubricating pump through the lubricant inflow portion when subjected to a suction force from the lubricating pump side; and a moving member disposed inside the cylindrical member so as to accommodate the fluid lubricant in a space portion formed between the moving member and the lubricant inflow portion in a state where the cylindrical member is attached to the connecting member of the lubricating pump, and moving inside the cylindrical member toward the lubricant inflow portion side as the fluid lubricant flows toward the lubricant inflow portion side when subjected to the suction force from the lubricating pump side, in which: the cylindrical member has a shoulder portion positioned on a lateral surface side of the lubricant inflow portion when the cylindrical member is attached to the connecting member of the lubricating pump; the moving member has a first moving main body portion capable of moving inside the cylindrical member and coming in contact with the shoulder portion, and a second moving main body portion capable of coming in contact with the lubricant inflow portion after the first moving main body portion comes in contact with the shoulder portion; the second moving main body portion has a center portion capable of coming in contact with the lubricant inflow portion, and a step portion connecting the center portion and the first moving main body portion; and the center portion has a recess recessed in a polygonal shape formed by connecting a plurality of apexes in a plan view.

In this case, it is preferable that the recess is formed in a pentagonal shape formed by connecting five apexes in a plan view.

In this case, it is preferable that groove portions each formed from the center portion to the step portion are communicated with the vicinities of the respective apexes of the recess.

In this case, it is preferable that the moving member is integrally molded by resin or rubber.

A second invention is a lubricant supply system including the lubricant cartridge container of the present invention.

Effect of the Invention

According to the first invention, the moving member is disposed inside the cylindrical member so as to accommodate the fluid lubricant in the space portion formed between the moving member and the lubricant inflow portion, in the state where the cylindrical member is attached to the connecting member of the lubricating pump. Further, the fluid lubricant flows toward the lubricant inflow portion side and the moving member moves inside the cylindrical member toward the lubricant inflow portion side when subjected to the suction force from the lubricating pump side.

The moving member moves toward the shoulder portion side of the cylindrical member as the fluid lubricant flows when subjected to the suction force from the lubricating pump side, and a volumetric capacity of the space portion partitioned and formed by the shoulder portion of the cylindrical member and the moving member (the space portion in which the fluid lubricant is accommodated) becomes small as the moving member when subjected to the suction force moves. Subsequently, the first moving main body portion of the moving member comes in contact with the shoulder portion. In addition, after the first moving main body portion of the moving member comes in contact with the shoulder portion, the second moving main body portion comes in contact with the lubricant inflow portion. At this time, the fluid lubricant which has been interposed between the second moving main body portion of the moving member and the lubricant inflow portion (including the flowed fluid lubricant which has been interposed between the first moving main body portion of the moving member and the shoulder portion) gradually passes through the lubricant inflow portion to be supplied to the lubricating pump.

Here, when the suction force acts on the center portion, bending in a polygonal shape occurs at the center portion. Accordingly, by forming, on the center portion, the recess recessed in the polygonal shape formed by connecting the plurality of apexes in a plan view, positions of a bending deformation region and the recess at the center portion coincide with each other, resulting in that deformation or displacement at the center portion and the step portion when subjected to the suction force is facilitated by the recess. Consequently, the center portion surely comes in contact with the lubricant inflow portion.

In particular, on the center portion when subjected to the suction force, lines or grooves due to the recessed deformation appear toward directions of respective apexes of a pentagonal shape. In accordance with this, a recess in a pentagonal shape is formed on the center portion. Accordingly, by previously forming, on the center portion, the recess in the pentagonal shape formed by connecting five apexes in a plan view, the center portion and the step portion are easily deformed or displaced.

Further, since the groove portions each formed from the center portion to the step portion are communicated with the vicinities of the respective apexes of the recess, the lines or the grooves at the center portion reaching the respective apexes of the recess are directly led to the step portion via the groove portions. This further facilitates the deformation or the displacement of the center portion and the step portion.

Further, since the moving member is integrally molded by resin or rubber, the moving member is provided with an elastic force required for an elastic deformation, and at the same time, it is possible to mold the moving member at a low cost.

According to the second invention, it is possible to prevent a control failure regarding drive control of the lubricant supply system.

BEST MODE FOR CARRYING OUT THE INVENTION

Figure 1:
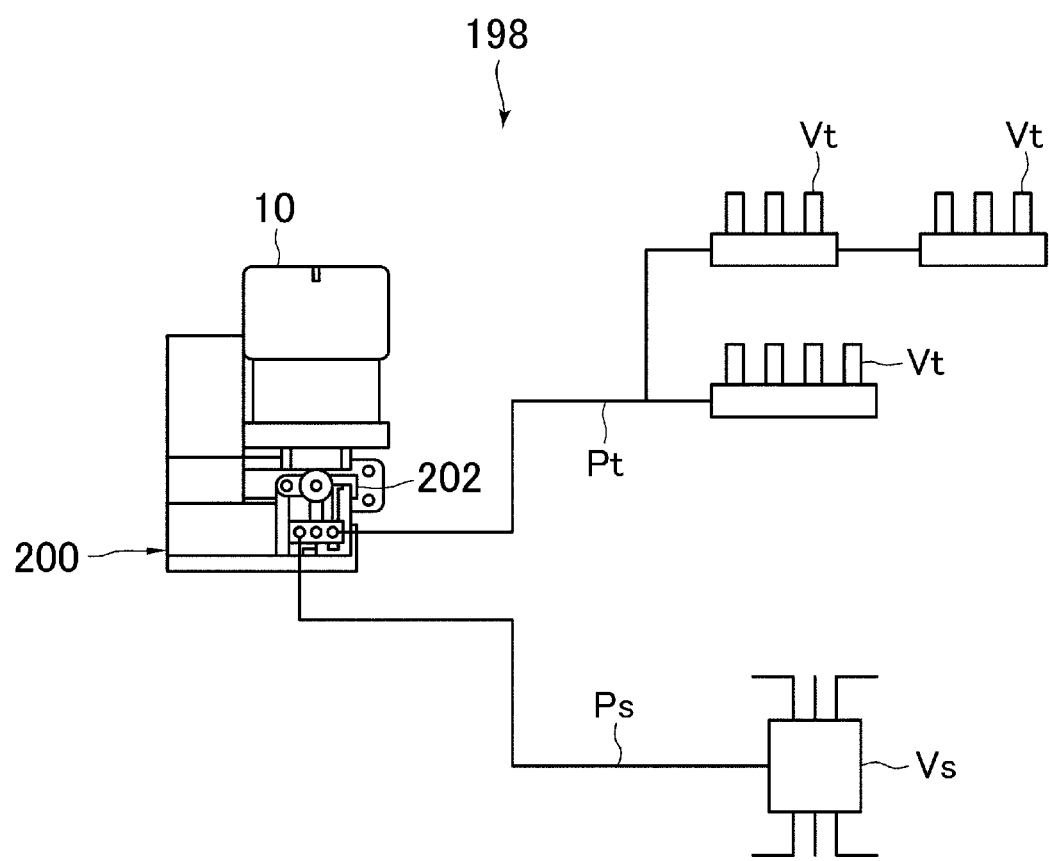
FIG. 1 is an explanatory diagram illustrating an entire configuration of a lubricant supply system according to a first embodiment of the present invention.

A lubricant cartridge container and a lubricant supply system according to a first embodiment of the present invention will be described while referring to the drawings.

The lubricant cartridge container of the present embodiment accommodates a fluid lubricant such as grease or oil which is supplied to a lubricating pump. For this reason, at a time of normal usage, the lubricant cartridge container is attached to a lubricating pump to be utilized as a lubricant supply system.

Accordingly, one example of a configuration of the lubricant supply system will be first described. The lubricant supply system supplies a fluid lubricant (appropriately referred to as "lubricant") such as grease or oil for the purpose of lubrication and the like of a machine tool, an industrial machine, and so on. Note that the configuration of the lubricating pump is not particularly limited.

As illustrated in FIG. 1, a lubricant supply system 198 has a lubricating pump 200 to which a lubricant cartridge container 10 is attached. The lubricating pump 200 is connected to a plurality of single metering valves Vt via a depressurization pipeline Pt. The single metering valve Vt includes a single piston (illustration is omitted) which is reciprocated by pressurization and depressurization of the fluid lubricant to discharge the fluid lubricant to a portion such as a toggle where an amount of lubrication may be relatively small, and one discharge port corresponding to the piston. The single metering valve Vt requires the depressurization since it discharges the fluid lubricant by being operated through the pressurization and the depressurization of the fluid lubricant, so that it is connected to the depressurization pipeline Pt.

The lubricating pump 200 is connected to a single progressive metering valve Vs via a non-depressurization pipeline Ps. The progressive metering valve Vs includes a plurality of pistons (illustration is omitted) which are sequentially reciprocated by pressurization of the fluid lubricant to discharge the fluid lubricant to a portion which requires a relatively large amount of lubrication, and a plurality of pairs of discharge ports, each pair corresponding to each piston. The progressive metering valve Vs is connected to the non-depressurization pipeline Ps in which the depressurization is not performed, in order to hold the pressure in the pipe when the pump is stopped, discharge the fluid lubricant in proper quantities from the progressive metering valve Vs, and keep the correct amount of discharge. As described above, the lubricating pump 200 is connected to the two system pipelines of the depressurization pipeline Pt and the non-depressurization pipeline Ps, for example. Further, the lubricating pump 200 may be connected to one system pipeline of only the depressurization pipeline Pt, or it may also be connected to one system pipeline of only the depressurization pipeline Ps.

The lubricating pump 200 includes a pump main body 202. The pump main body 202 is provided with a function of making a suction force act on the inside of the lubricant cartridge container 10 to supply the fluid lubricant filled in the lubricant cartridge container 10 to the depressurization pipeline Pt and the non-depressurization pipeline Ps. The pump main body 202 is, for example, a plunger-type pump provided with a piston and a cylinder (illustration is omitted), and reciprocatingly driven by a drive motor (illustration is omitted) via a cam mechanism (illustration is omitted).

Next, a structure of the lubricant cartridge container 10 will be described.

Figure 2:
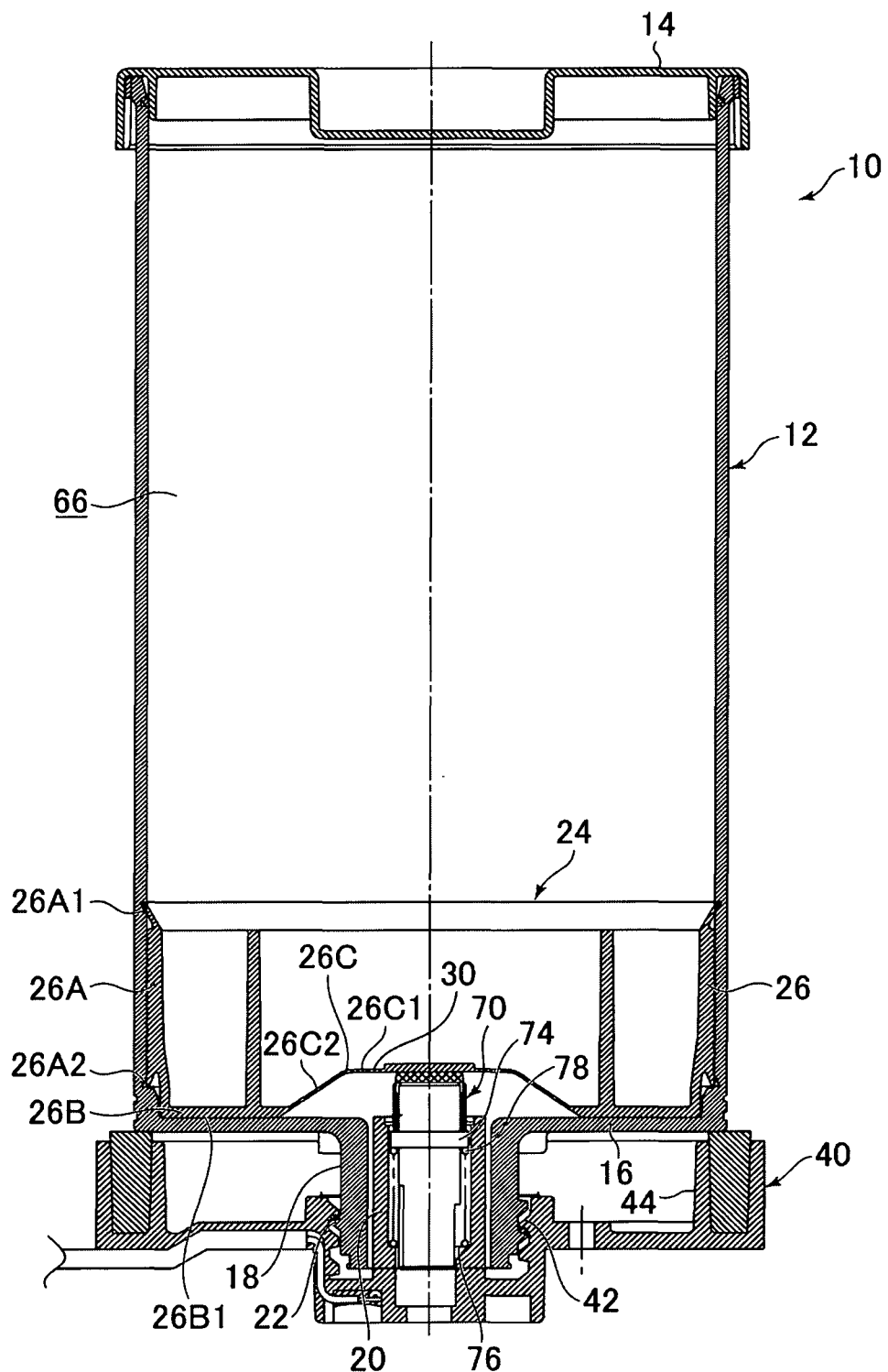
FIG. 2 is a vertical sectional view of a lubricant cartridge container according to the first embodiment of the present invention.

As illustrated in FIG. 2, the lubricant cartridge container 10 includes a cylindrical member 12 having a cylindrical shape. The cylindrical member 12 functions as a casing main body which accommodates a fluid lubricant (appropriately referred to as "lubricant") such as grease or oil used for the purpose of lubrication and the like of a machine tool, an industrial machine, and so on.

An outer peripheral surface and an inner peripheral surface of the cylindrical member 12 are formed into smooth curved surfaces. For this reason, bellows portions or projections and depressions are not formed on the outer peripheral surface and the inner peripheral surface of the container, unlike the lubricant cartridge container of the prior art. Consequently, the fluid lubricant does not accumulate (does not stay) at the inner peripheral surface of the cylindrical member 12.

Note that the material of the cylindrical member 12 is not particularly limited, but, it is preferably a transparent polyester resin, milk-white polypropylene (PP), transparent polyethylene (PE), or the like, for example.

A lid portion 14 is disposed on one axial end portion of the cylindrical member 12. When the lid portion 14 is attached to the one axial end portion of the cylindrical member 12, the one axial end portion of the cylindrical member 12 is in a state of being closed by the lid portion 14. For this reason, there is no chance that the fluid lubricant accommodated in the cylindrical member 12 leaks from the one axial end portion of the cylindrical member 12. By the attachment of the lid portion 14, a deformation of the lubricant cartridge container 10 is eliminated to maintain the cylindrical shape of the inside of the container.

A shoulder portion 16 is formed on the other axial end portion of the cylindrical member 12. The shoulder portion 16 is configured by a diameter-reduced portion formed by reducing a diameter of the cylindrical member 12.

Note that the shoulder portion 16 is not limited to one with an inclined configuration, and it may be horizontal from the radially outer side toward the radially inner side in a state where the lubricant cartridge container 10 is attached to the lubricating pump 200.

A neck portion 18 is formed on the radially inner side of the shoulder portion 16. The neck portion 18 is formed in a cylindrical shape as a whole, and in the state where the lubricant cartridge container 10 is attached to the lubricating pump 200, the neck portion 18 is positioned on the radially outer side of a lubricant inflow portion 20 which is used for leading the fluid lubricant to the lubricating pump 200.

Note that the lubricant inflow portion 20 is attached to a connecting member 40 of the lubricating pump 200. A screw portion 22 (for example, a male screw portion) is formed on an outer peripheral surface of the neck portion 18. The screw portion 22 of the outer peripheral surface of the neck portion 18 is screwed together with a screw portion 42 (for example, a female screw portion) formed on the connecting member 40, resulting in that the lubricant cartridge container 10 is attached to the lubricating pump 200.

A moving member 24 is provided inside the cylindrical member 12. The moving member 24 moves along the axial direction of the cylindrical member 12. In particular, the moving member 24 moves from the one axial side toward the other axial side (the lubricant inflow portion 20 side) of the cylindrical member 12 when subjected to the suction force that acts from the lubricating pump 200 side.

The moving member 24 includes a cylindrical moving member main body 26. The moving member main body 26 has a cylinder portion 26A which faces the inner peripheral surface of the cylindrical member 12, a first moving main body portion 26B which is integrally formed on the cylinder portion 26A and which extends toward the radially inner side of the cylinder portion 26A, and a second moving main body portion 26C which is integrally formed on the cylinder portion 26A and which extends toward the radially inner side of the first moving main body portion 26B.

The first moving main body portion 26B can move inside the cylindrical member 12 and come in contact with the shoulder portion 16. The second moving main body portion 26C can come in contact with the lubricant inflow portion 20 after the first moving main body portion 26B comes in contact with the shoulder portion 16.

Here, it is preferable that the moving member 24 is integrally molded by resin, rubber, or the like. Although polyethylene, for example, is appropriate as the material, the material is not limited to this. Consequently, it is possible to mold the moving member 24 in a manner that the rigidity of a side surface of the moving member 24 becomes high and a center portion of the moving member 24 becomes soft.

Further, it is also possible to use an elastomer or rubber. If the rubber is employed, nitrile-butadien rubber (NBR) with a rubber hardness (50 to 60 degrees) is appropriate, but, it is not limited to this.

Since the moving member 24 is integrally molded by the resin, the rubber, or the like, it is possible to manufacture the moving member 24 at a low cost.

However, it is also possible that the moving member 24 is formed by combining a plurality of members with different materials. Accordingly, it is possible to use a high-rigidity member at a portion requiring high rigidity and use a soft member at a portion requiring the flexibility, which makes it possible to simultaneously secure the rigidity and the flexibility of the moving member 24.

The cylinder portion 26A has pressurized pieces 26A1, 26A2 which are formed on the radially outer side and pressed against the inner peripheral surface of the cylindrical member 12. In a state where the moving member 24 is disposed inside the cylindrical member 12, the pressurized pieces 26A1, 26A2 are pressed against the inner peripheral surface of the cylindrical member 12 to be elastically deformed.

Note that also when the moving member 24 moves inside the cylindrical member 12, the elastic deformation of the pressurized pieces 26A1, 26A2 is maintained.

By the operation of the pressurized pieces 26A1, 26A2 of the cylinder portion 26A, it is possible to prevent the fluid lubricant from passing through between the outer peripheral surface of the moving member 24 and the inner peripheral surface of the cylindrical member 12 in the state where the moving member 24 is disposed inside the cylindrical member 12 and when the moving member 24 moves inside the cylindrical member 12.

Specifically, when the moving member 24 moves inside the cylindrical member 12, the pressurized pieces 26A1, 26A2 of the cylinder portion 26A operate so as to scrape the fluid lubricant adhered to the inner peripheral surface of the cylindrical member 12 off the inner peripheral surface, resulting in that the fluid lubricant does not adhere to the inner peripheral surface of the cylindrical member 12, and besides, it is possible to prevent the fluid lubricant from flowing to the rear side (the lid portion 14 side) of the moving member 24.

Figure 3:
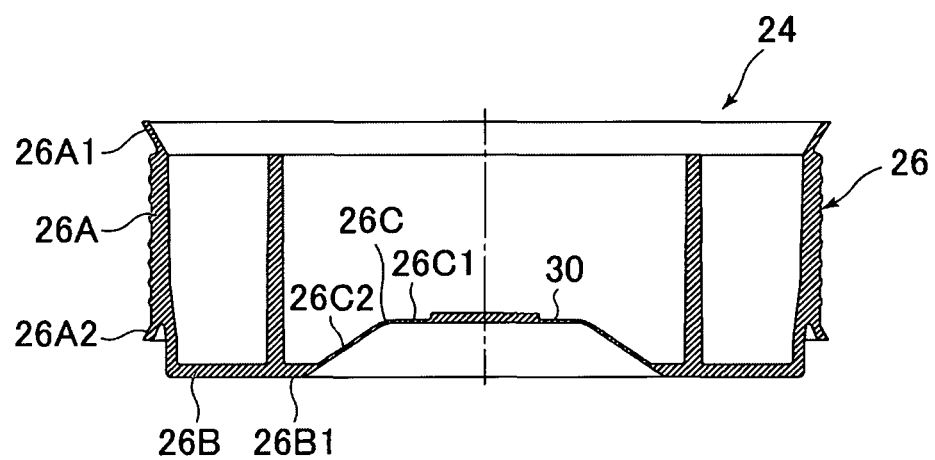
FIG. 3 is a vertical sectional view of a moving member of the lubricant cartridge container according to the first embodiment of the present invention.

As illustrated in FIG. 2 and FIG. 3, the second moving main body portion 26C is configured to project toward a side (the lid portion 14 side) opposite to the shoulder portion 16 side relative to the first moving main body portion 26B. Specifically, the second moving main body portion 26C has a center portion 26C1 which comes in contact with a level switch 70 and the lubricant inflow portion 20, and a step portion 26C2 which connects the center portion 26C1 and a radially inner end portion of a bottom portion 26B1 of the first moving main body portion 26B.

The center portion 26C1 of the second moving main body portion 26C has a plane portion formed in a plane state, and it comes in contact with the lubricant inflow portion 20 after a lapse of predetermined time after the first moving main body portion 26B comes in contact with the shoulder portion 16. Specifically, the center portion 26C1 of the second moving main body portion 26C comes in contact with the lubricant inflow portion 20 with a time difference after the first moving main body portion 26B comes in contact with the shoulder portion 16.

When the center portion 26C1 of the second moving main body portion 26C comes in contact with the lubricant inflow portion 20, the step portion 26C2 is elastically deformed. Since the step portion 26C2 is elastically deformed, the center portion 26C1 of the second moving main body portion 26C approaches the lubricant inflow portion 20 in a state of being substantially parallel to a contact surface of the lubricant inflow portion 20, and comes in contact with the lubricant inflow portion 20. As described above, the step portion 26C2 is elastically deformed, which keeps a normal movement trajectory when the center portion 26C1 of the second moving main body portion 26C approaches the lubricant inflow portion 20, and realizes a smooth contact of the center portion 26C1 of the second moving main body portion 26C with respect to the lubricant inflow portion 20.

Since the step portion 26C2 is used to form a level difference between the bottom portion 26B1 of the first moving main body portion 26B and the center portion 26C1 of the second moving main body portion 26C, and connect the bottom portion 26B1 and the center portion 26C1, the rigidity of the moving member 24 increases by a volume of the step portion 26C2. Accordingly, even when an external force acts between the bottom portion 26B1 of the first moving main body portion 26B and the center portion 26C1 of the second moving main body portion 26C, the step portion 26C2 with high rigidity is elastically deformed, resulting in that energy of the external force is converted into elastic energy of the step portion 26C2 and accumulated in the step portion 26C2. As described above, a volume of the moving member 24 is increased to enhance the rigidity, which makes it possible to improve the strength of the entire moving member.

Figure 4:
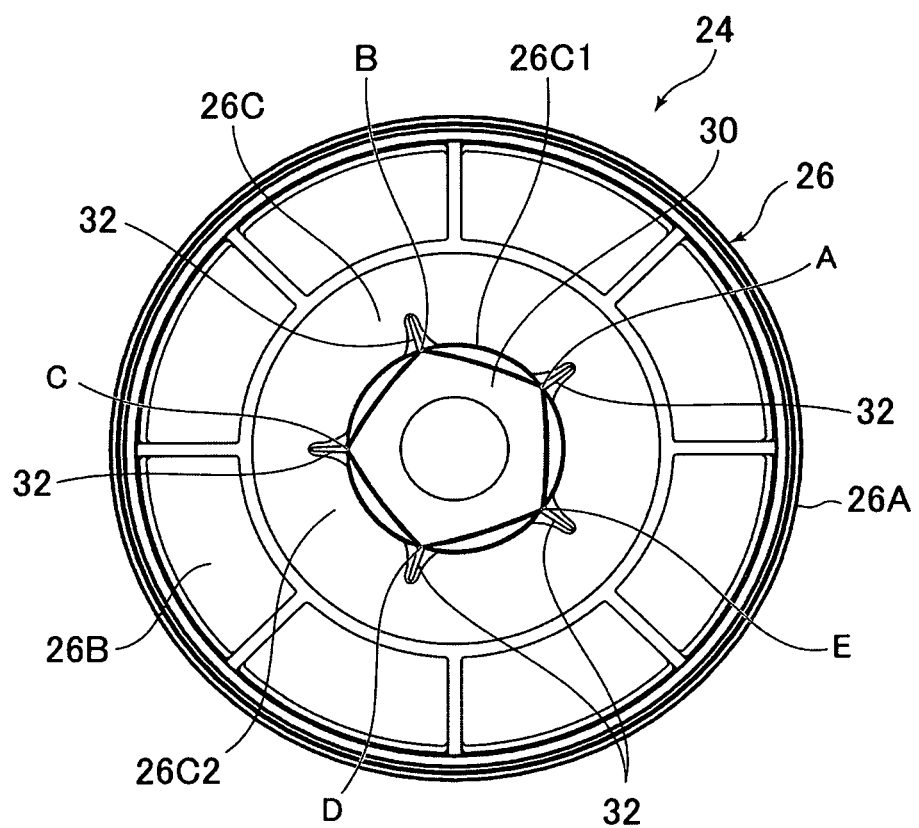
FIG. 4 is a plan view of the moving member of the lubricant cartridge container according to the first embodiment of the present invention.

As illustrated in FIG. 4, on the center portion 26C1, there is formed a recess 30 recessed in a polygonal shape formed by connecting a plurality of apexes in a plan view. Concretely, the recess 30 is depressed toward the lubricant inflow portion 20 side.

In particular, it is preferable that the recess 30 is formed in a pentagonal shape formed by connecting five apexes (apexes A to E) in a plan view illustrated in FIG. 4. In other words, the recess 30 is depressed in a pentagonal shape toward the lubricant inflow portion 20 side.

The recess 30 has a function of facilitating the deformation or the displacement of the center portion 26C1 and the step portion 26C2, so that it is also referred to as a displacement facilitating portion.

Further, it is preferable that groove portions 32 each formed from the center portion 26C1 to the step portion 26C2 are communicated with the vicinities of the respective apexes A to E of the recess 30.

As described above, the lubricant cartridge container 10 is mainly configured by the cylindrical member 12 and the moving member 24. Further, during a period of time from when the fluid lubricant is in an unused state to when the bottom portion 26B1 of the first moving main body portion 26B of the moving member 24 comes in contact with the shoulder portion 16, a filling space portion (illustration is omitted) is formed between the shoulder portion 16 of the cylindrical member 12 and the moving member 24.

Note that a volumetric capacity of the filling space portion gradually decreases as the moving member 24 moves inside the cylindrical member 12 toward the shoulder portion 16 side. Further, when the moving member 24 moves inside the cylindrical member 12 toward the shoulder portion 16 side, a space portion 66 is formed between the lid portion 14 and the moving member 24, and a volumetric capacity of the space portion 66 gradually increases.

In the lubricant cartridge container 10 in an unused state (illustration is omitted), the volumetric capacity of the filling space portion is maximized, and the fluid lubricant is filled in the filling space portion. Subsequently, as the fluid lubricant is supplied to the lubricating pump 200, the moving member 24 moves inside the cylindrical member 12 toward the shoulder portion 16 side, resulting in that the volumetric capacity of the filling space portion becomes small and an amount of the fluid lubricant filled in the filling space portion also becomes small.

Here, a configuration of the connecting member 40 of the lubricating pump 200 will be described.

As illustrated in FIG. 1 and FIG. 2, the connecting member 40 includes a supporting portion 44 which supports the shoulder portion 16 of the cylindrical member 12 of the lubricant cartridge container 10. On the connecting member 40, there is formed the lubricant inflow portion 20 for leading the fluid lubricant to the lubricating pump 200 side. On the radially outer side of the lubricant inflow portion 20, there is formed the screw portion 42 (female screw portion)

which is screwed together with the screw portion 22 of the cylindrical member 12 of the lubricant cartridge container 10, as described above.

The lubricant inflow portion 20 is formed in a cylindrical shape in its external appearance, and a level switch 70 is disposed therein. The level switch 70 can be a trigger for executing control regarding driving of the lubricant supply system 198 and, for example, when the fluid lubricant filled in the lubricant cartridge container 10 runs out, the level switch 70 outputs a stop signal which stops the suction force acted from the lubricating pump 200 side and an exchange signal indicating an exchange of the lubricant cartridge container 10, to thereby make a warning sound indicating a time of exchange of the lubricant cartridge container 10 to be output.

On a lateral surface of the level switch 70, a projection 74 is formed. A small-sized coil spring 78 is disposed between the projection 74 and a supporting surface 76 of the lubricant inflow portion 20. For this reason, the level switch 70 is in a state of being supported by the coil spring 78.

Here, in a state where an external force does not act on the level switch 70, a tip portion of the level switch 70 is in a state of projecting toward the outside of the lubricant inflow portion 20 (the moving member 24 side).

Note that an inflow hole (illustration is omitted) is formed on the level switch 70. The fluid lubricant which is supplied from the lubricant cartridge container 10 passes through the inflow hole to be led to the inside of the lubricating pump 200.

The configuration is not limited to one in which the above-described level switch 70 is disposed in the lubricant inflow portion 20. The configuration in which the level switch 70 is provided is described as one example, and it is possible to attach the lubricant cartridge container 10 even to the connecting member 40 in which the level switch 70 is not disposed in the lubricant inflow portion 20.

Next, operations of the lubricant cartridge container 10 and the lubricant supply system 198 of the first embodiment will be described.

As illustrated in FIG. 1 and FIG. 2, the lubricant cartridge container 10 is attached to the lubricating pump 200. In order to attach the lubricant cartridge container 10 to the lubricating pump 200, the cylindrical member 12 is rotated so that the screw portion 22 (for example, the male screw portion) formed on the outer peripheral surface of the neck portion 18 of the cylindrical member 12 which configures the lubricant cartridge container 10 is screwed together with the screw portion 42 (for example, the female screw portion) formed on the connecting member 40. Consequently, the cylindrical member 12 moves toward an attachment surface side of the connecting member 40, and the lubricant cartridge container 10 is attached to the lubricating pump 200. At this time, the lubricant inflow portion 20 is in a state of being inserted into the neck portion 18.

Since the suction force acts from the lubricating pump 200 side, the fluid lubricant filled in the filling space portion of the cylindrical member 12 of the lubricant cartridge container 10 is subjected to the suction force to move (flow) toward the lubricant inflow portion 20 side. The fluid lubricant moved to the lubricant inflow portion 20 side passes through the inflow hole of the level switch 70 to infiltrate into the lubricating pump 200. Consequently, the fluid lubricant is supplied to the lubricating pump 200.

Here, when the suction force keeps acting from the lubricating pump 200 side, the fluid lubricant filled in the filling space portion of the cylindrical member 12 of the lubricant cartridge container 10 continuously passes through the lubricant inflow portion 20 (the inflow hole of the level switch 70) to infiltrate into the lubricating pump 200. Consequently, the volume of the fluid lubricant filled in the filling space portion of the cylindrical member 12 of the lubricant cartridge container 10 becomes small. Further, in accordance with this, since the moving member 24 is also subjected to the suction force, the moving member 24 moves toward the shoulder portion 16 side of the cylindrical member 12.

Since the pressurized pieces 26A1, 26A2 attached to the moving member 24 are pressed against the inner peripheral surface of the cylindrical member 12 at a predetermined pressure, the pressurized pieces 26A1, 26A2 are in a state of being elastically deformed all the time by receiving a reaction force from the inner peripheral surface of the cylindrical member 12. For this reason, a portion between the outer peripheral surface of the moving member 24 and the inner peripheral surface of the cylindrical member 12 is maintained to be an air-tightly sealed state. This prevents the fluid lubricant from passing through between the outer peripheral surface of the moving member 24 and the inner peripheral surface of the cylindrical member 12 to move to the space portion 66 side.

As illustrated in FIG. 2, when the moving member 24 soon reaches the shoulder portion 16 of the cylindrical member 12, the bottom portion 26B1 of the first moving main body portion 26B of the moving member 24 comes in contact with the shoulder portion 16. At this time, the fluid lubricant filled between the shoulder portion 16 of the cylindrical member 12 and the first moving main body portion 26B of the moving member 24 passes through the lubricant inflow portion 20 (the inflow hole of the level switch 70) to be supplied to the lubricating pump 200.

Subsequently, the first moving main body portion 26B of the moving member 24 reaches the shoulder portion 16 of the cylindrical member 12, and at the same time, the center portion 26C1 of the second moving main body portion 26C of the moving member 24 comes in contact with the level switch 70.

Here, since the recess 30 recessed in a polygonal shape formed by connecting a plurality of apexes in a plan view is formed on the center portion 26C1, positions of a bending deformation region and the recess 30 at the center portion 26C1 coincide with each other, resulting in that deformation or displacement at the center portion 26C1 and the step portion 26C2 when subjected to the suction force is facilitated by the recess 30. Consequently, the center portion 26C1 surely comes in contact with the lubricant inflow portion 20.

In particular, on the center portion 26C1 when subjected to the suction force, large lines or grooves due to the recessed deformation appear toward directions of respective apexes of a pentagonal shape. In accordance with this, a pentagonal recess is formed on the center portion 26C1. Accordingly, since the pentagonal recess 30 having five apexes A to E is formed on the center portion 26C1, the center portion 26C1 and the step portion 26C2 are further easily deformed or displaced.

In addition, since the groove portions 32 each formed from the center portion 26C1 to the step portion 26C2 are communicated with the vicinities of the respective apexes of the recess 30, the lines or the grooves at the center portion 26C1 reaching the respective apexes of the recess 30 are directly led to the step portion 26C2 via the groove portions 32. This further facilitates the deformation or the displacement of the center portion 26C1 and the step portion 26C2.

Further, when the suction force keeps acting from the lubricating pump 200 side, the center portion 26C1 of the second moving main body portion 26C of the moving member 24 presses the level switch 70. In particular, since the recess 30 is formed on the center portion 26C1, the center portion 26C1 easily moves to come in contact with the level switch 70. At this time, a pressing force which acts on the level switch 70 from the center portion 26C1 of the second moving main body portion 26C becomes larger than an elastic force which acts on the level switch 70 from the coil spring 78, so that the level switch 70 moves downward by resisting against the elastic force of the coil spring 78.

Finally, the entire level switch 70 is hidden in the lubricant inflow portion 20, and the center portion 26C1 of the second moving main body portion 26C of the moving member 24 comes in contact with the lubricant inflow portion 20. At this time, since the entire level switch 70 is hidden in the lubricant inflow portion 20, the level switch 70 is activated, resulting in that the above-described various control signals are output, to thereby stop the supply of the fluid lubricant filled in the cylindrical member 12 to the lubricating pump 200, and the like.

In particular, since the recess 30 is formed on the center portion 26C1, the center portion 26C1 surely presses the level switch 70 to activate the switch. Subsequently, the various control signals according to the driving of the lubricant supply system 198 are output.

Note that one example of the various control signals includes, for example, a stop signal which stops the suction force acted from the lubricating pump 200 side, an exchange signal indicating an exchange of the lubricant cartridge container 10, and so on.

It should be noted that one example of the invention of the above-described embodiment is exemplified, and the present invention is not limited to the above-described embodiment. The technical idea of the present invention includes a design change and so on of the above-described embodiment as a matter of course.

EXPLANATION OF CODES 10 lubricant cartridge container
12 cylindrical member
16 shoulder portion
20 lubricant inflow portion
24 moving member
26 moving member main body
26A cylinder portion
26A1 pressurized piece
26A2 pressurized piece
26B first moving main body portion
26C second moving main body portion
26C1 center portion
26C2 step portion
30 recess
32 groove portion
40 connecting member
198 lubricant supply system
200 lubricating pump

The invention claimed is:

1. A lubricant cartridge container which supplies a fluid lubricant to a lubricating pump by being attached to a connecting member of the lubricating pump provided with a lubricant inflow portion for leading the fluid lubricant to the lubricating pump, the lubricant cartridge container comprising:
a cylindrical member configured to be able to fill the fluid lubricant therein, attached to the connecting member of the lubricating pump, and supplying the fluid lubricant to the lubricating pump through the lubricant inflow portion when subjected to a suction force from a lubricating pump side; and
a moving member disposed inside the cylindrical member so as to accommodate the fluid lubricant in a space portion formed between the moving member and the lubricant inflow portion in a state where the cylindrical member is attached to the connecting member of the lubricating pump, and moving inside the cylindrical member toward a lubricant inflow portion side as the fluid lubricant flows toward the lubricant inflow portion side when subjected to the suction force from the lubricating pump side, wherein:
the cylindrical member has a shoulder portion positioned on a lateral surface side of the lubricant inflow portion when the cylindrical member is attached to the connecting member of the lubricating pump;
the moving member has a first moving main body portion capable of moving inside the cylindrical member and coming in contact with the shoulder portion, and a second moving main body portion capable of coming in contact with the lubricant inflow portion after the first moving main body portion comes in contact with the shoulder portion;
the second moving main body portion has a center portion capable of coming in contact with the lubricant inflow portion, and a step portion connecting the center portion and the first moving main body portion;
the center portion is located laterally inside and vertically above the step portion in a state that the cylindrical member is attached to the connecting member of the lubricating pump,
the center portion has a recess in a polygonal shape having a plurality of apexes in a plan view, and
groove portions are formed in the step portion, each extending laterally outwardly from a vicinity of each of the plurality of apexes.

2. The lubricant cartridge container according to claim 1, wherein
the recess has a pentagonal shape having five apexes in the plan view.

3. The lubricant cartridge container according to claim 1, wherein the moving member is integrally molded by resin or rubber.

4. A lubricant supply system, comprising
the lubricant cartridge container according to claim 1.

5. The lubricant cartridge container according to claim 1, wherein the center portion has a plane portion, in which the recess is recessed, and the step portion extends obliquely and forms a level difference between a bottom portion of the first moving main body portion and the center portion.

* * * * *